US012554308B2

(12) United States Patent
Guan et al.

(10) Patent No.: US 12,554,308 B2
(45) Date of Patent: Feb. 17, 2026

(54) ADAPTIVE THRESHOLD FOR USER ABSENCE PREDICTION FOR POWER STATE TRANSITIONS

(71) Applicant: Microsoft Technology Licensing, LLC, Redmond, WA (US)

(72) Inventors: Aobo Guan, Redmond, WA (US); Rachita Gupta, Seattle, WA (US); Henry Minseok Kwak, Redmond, WA (US); Drew Cross, Bothell, WA (US); Jonathan Bret Barkelew, Seattle, WA (US); Jacob Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 18/742,147

(22) Filed: Jun. 13, 2024

(65) Prior Publication Data
US 2025/0383700 A1 Dec. 18, 2025

(51) Int. Cl.
  *G06F 1/32* (2019.01)
  *G06F 1/3228* (2019.01)
  *G06F 1/3231* (2019.01)
  *G06F 1/329* (2019.01)

(52) U.S. Cl.
  CPC .......... *G06F 1/3231* (2013.01); *G06F 1/3228* (2013.01); *G06F 1/329* (2013.01)

(58) Field of Classification Search
  CPC ....... G06F 1/3231; G06F 1/3228; G06F 1/329
  See application file for complete search history.

(56) References Cited

U.S. PATENT DOCUMENTS

| | | | |
|---|---|---|---|
| 11,650,648 B2 * | 5/2023 | Nge | G06F 18/241 |
| | | | 713/300 |
| 12,346,191 B2 * | 7/2025 | Han | G06F 1/3231 |
| 2019/0258308 A1 * | 8/2019 | Bostick | G06F 1/3234 |
| 2020/0133374 A1 * | 4/2020 | Sinha | G06F 3/013 |
| 2021/0109585 A1 * | 4/2021 | Fleming | G06F 1/3234 |
| 2021/0240493 A1 * | 8/2021 | Hamlin | G06F 9/4418 |
| 2021/0327394 A1 * | 10/2021 | Bui | G06F 1/3231 |
| 2023/0060649 A1 * | 3/2023 | Cho | H04L 25/022 |
| 2024/0241934 A1 * | 7/2024 | Reddy | G06F 21/32 |
| 2024/0273182 A1 * | 8/2024 | Hamlin | G06F 9/4411 |

* cited by examiner

*Primary Examiner* — Zahid Choudhury

(57) ABSTRACT

Systems and methods are provided for implementing an adaptive threshold for user absence prediction for power state transitions. A controller of a device monitors a user presence and/or absence of a user, in some cases, correlated with time, and determines whether the user presence and/or absence at the correlated time is consistent with a power management model that is based on a time-based probability of user absence relative to a dynamic probability threshold. The dynamic probability threshold is a function (e.g., a sum) of a base probability threshold corresponding to device-specific time-usage characteristics and a heuristic probability threshold corresponding to user-specific time-usage characteristics. When inconsistent, the controller adjusts the dynamic probability threshold to account for the user presence and/or absence at the correlated time. The controller updates the power management model based on the dynamic probability threshold, and sets a sleep or wake state of the device accordingly.

20 Claims, 7 Drawing Sheets

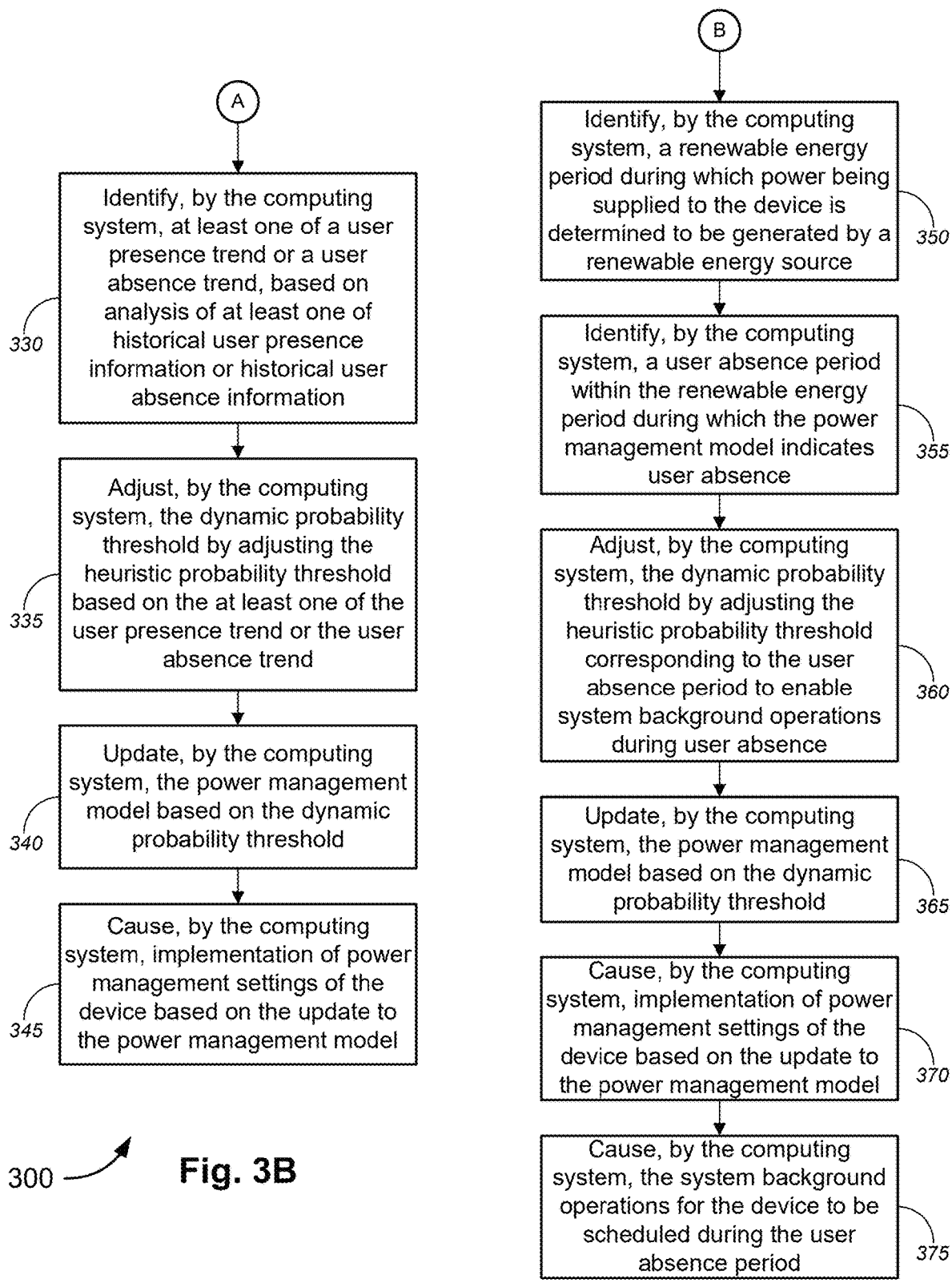

ADAPTIVE THRESHOLD FOR USER ABSENCE PREDICTION FOR POWER STATE TRANSITIONS

BACKGROUND

Modern computers and devices have various power states, each with their energy consumption and response time characteristics. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for implementing an adaptive threshold for user absence prediction for power state transitions. An operating system ("OS") or a controller of a device may monitor a user presence state, including a user presence and/or a user absence, in some cases, correlated with time. The OS or controller may determine whether the user presence and/or the user absence at the correlated time is consistent with a power management model that is based on a time-based probability of user absence relative to a dynamic probability threshold. The dynamic probability threshold is a function of (in some cases, a sum of) a base probability threshold that corresponds to device-specific time-usage characteristics and a heuristic probability threshold that corresponds to user-specific time-usage characteristics. Based on a determination that the user presence state is inconsistent with the power management model, the OS or controller may adjust the dynamic probability threshold by adjusting the heuristic probability threshold to account for the user presence state. The OS or controller may update the power management model based on the dynamic probability threshold, and may cause implementation of power management settings of the device based on the update to the power management model, e.g., by causing the device to be set to a sleep state or a wake state.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 3A-3C depict an example method for implementing an adaptive threshold for user absence prediction for power state transitions.

DETAILED DESCRIPTION OF CERTAIN EMBODIMENTS

Figure 1:
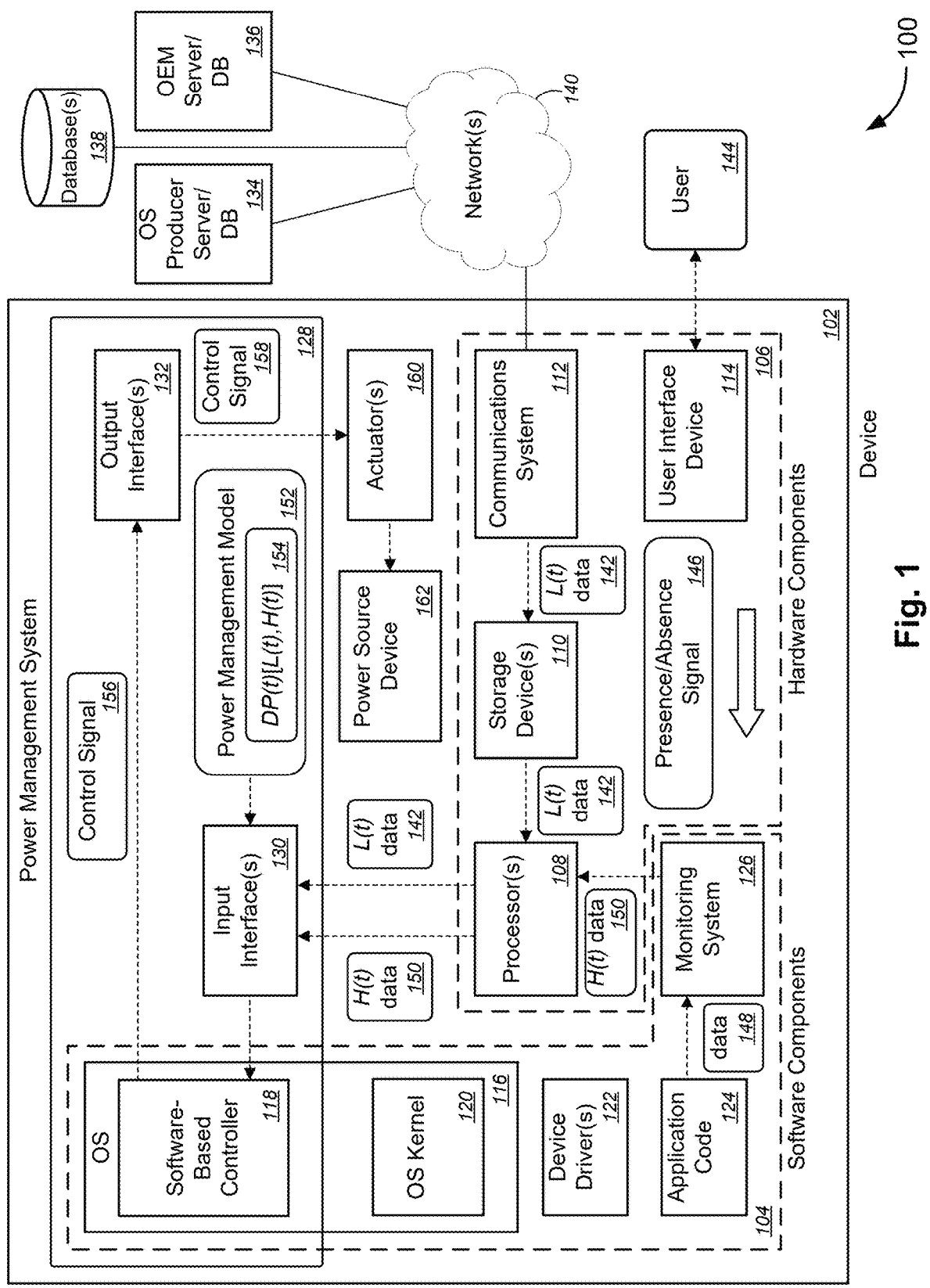
FIG. 1 depicts an example system for implementing an adaptive threshold for user absence prediction for power state transitions.

As briefly discussed above, modern computers and devices have various power states, each with their energy consumption and response time characteristics. Implementing power management for such devices, however, may raise issues, particularly, with traditional fixed probability limits (e.g., probability limit L*). A probability limit L* that is set too high may result in a device that is set to be active with short suspend durations, which may result in wasted energy during the resultant active state while the user is actually away. A probability limit L* that is set too low may result in the device being suspended with long suspend durations or with more frequent suspend states, which may result in poor responsiveness.

Among other things, the technology discussed herein differs from techniques and systems using fixed probability limits that result in either wasted energy or poor responsiveness. Rather, the present technology provides an adaptive threshold for user absence prediction for power state transitions that may be based on a dynamic probability threshold that is a function of (in some cases, a sum of) a base probability threshold (e.g., $L(t)$) that corresponds to device-specific time-usage characteristics and a heuristic probability threshold (e.g., $H(t)$) that corresponds to user-specific time-usage characteristics. By replacing the traditional fixed probability limit L* with a dynamic and adaptive model, the system described herein provides an efficient solution to optimizing computer power state transitions (from a wake to a sleep state, or vice versa). Customization based on both device-specific characteristics $L(t)$ and individual user behavior $H(t)$ ensures an optimal balance between energy savings and responsiveness, addressing the limitations of existing power management systems.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing power management functionalities, and, more particularly, to methods, systems, and apparatuses for implementing an adaptive threshold for user absence prediction for power state transitions, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing an adaptive threshold for user absence prediction for power state transitions. System 100 includes device 102, which includes software components 104 and hardware components 106 (collectively referred to herein as "device components"). In examples, the device 102 is one of a smart phone, a mobile phone, a tablet computer, a desktop computer, a handheld gaming device, a gaming console, or a server, and can be any suitable device that has an OS and multiple device components that share a power source. In some examples, the software components 104 include an OS 116, an OS kernel 120, device drivers 122, application code 124, and monitoring system 126. The hardware components 106 include a processor(s) 108, including at least one of a central processing unit(s) ("CPU(s)"), a graphics processing unit(s) ("GPU(s)"), and/or a neural processing unit(s) ("NPU(s)"), or other processor(s). In examples, the hardware components 106 further include at least one of a storage device(s) 110, a communications system 112, and a user interface device 114. In some cases, the storage device(s) 110 includes a hard disk drive(s) ("HDD(s)"), a solid state drive(s) ("SSD(s)"), or other data storage devices. In some instances, the user interface device 114 includes a user input device(s) (e.g., a keyboard, a mouse, a stylus(es), a microphone(s), a user interface controller(s), a camera(s), a capacitive sensor(s), and/or a touch input device(s)) and an output device(s) (e.g., a display device(s), a speaker(s), and/or a printer(s)). In some cases, the user interface device 114 further includes ports, connections, and/or device interfaces (e.g., a device driver interface ("DDI") or a plug-and-play ("PNP") device interface), and the user input device(s) and/or the output device(s) each either integrated with device 102 or external, yet communicatively coupled, to the device 102 via the ports, connections, and/or device interfaces. In examples, each device component among the plurality of device components (e.g., software components 104 and/or hardware components 106) is either integrated with the device 102 or separate from, yet connected to, the device 102.

System 100 further includes power management system 128, which includes an input interface(s) 130, a software-based controller(s) 118, and an output interface(s) 132. Although not shown, the software components 104 further include software modules operating on the OS 116. In some examples, the software-based controller(s) 118 are part of the OS 116 and/or the other software modules. In examples, the software-based controller(s) 118 includes a user-space application ("app"), a service, a kernel-space service, a device driver, and/or other type of controller. In some cases, the power management system 128 includes multiple input and/or output interfaces 130/132 and multiple software-based controllers 118. In examples, system 100 further includes at least one of an OS producer server or database 134 associated with an OS producer of the OS 116 of the device 102, an original equipment manufacturer ("OEM") server or database 136 associated with an OEM of the device 102, and/or database(s) 138, each of which is communicatively coupled with device 102 via communications system 112 and network(s) 140. Network(s) 140 includes at least one of a distributed computing network, such as the Internet, a private network, a commercial network, or a cloud network, and/or the like.

In some examples, device 102 receives base probability threshold (L or L(t)) data 142 from one of the OS producer server or database 134, the OEM server or database 136, or the database(s) 138. The received base probability threshold (L or L(t)) data 142, which corresponds to device-specific time-usage characteristics, is stored in storage device(s) 110 and loaded to random access memory ("RAM") or other working memory at runtime. In an example, the base probability threshold (L or L(t)) represents a portrait of expected user behavior for a certain type or model of device 102 (e.g., as indicated by stock keeping unit ("SKU"), model number, or other indication of type or model of the device 102), although not specific to a particular user of device 102. The base probability threshold (L or L(t)) is specified, set, or adjusted by one of the OS producer of the OS 116 of the device 102, the OEM of the device 102, a system administrator for the device 102, or a software module operating on the device 102. In an example, for Enterprise OSs, OS producers set L(t) to high values during working hours to reduce the likelihood of the device 102 from being suspended, being placed in a standby mode, or being set to a power saving mode, and set L(t) to low values outside of working hours to enable a suspended, standby, or power-saving state. In another example, for server OSs, OS producers set L(t) to high values all the time to optimize its response speed. In yet another example, where a portrait of user behavior may be different for gaming devices (e.g., gaming laptop computers and gaming desktop computers) compared with office devices (e.g., office laptop computers and office desktop computers), OEMs have the flexibility to address such differences by specifying, setting, or adjusting L(t) accordingly. In still another example, system administrators and/or software modules specify, set, or adjust L(t) to tune the prediction behavior for various reasons or purposes.

The user interface device 114 receives user input from user 144 and/or allows interaction with user 144. In examples, user input and/or user interaction is indicative of user presence, while lack of or absence of user input and/or user interaction (particularly after a preset non-interaction interval) is indicative of user absence. Monitoring system 126 receives, from user interface device 114, a presence and/or absence signal 146 indicative of user presence and/or user absence, respectively. In some examples, application code 124 includes a calendar app and/or a task scheduler app, and the calendar app and/or the task scheduler app includes calendar information and/or task scheduler information corresponding to periods during which user presence and/or user absence is expected (collectively, "data 148"). Monitoring system 126 may further receive data 148. The presence and/or absence signal 146 and/or the data 148 individually or collectively correspond to user behavior or user-specific time-usage characteristics, which is represented by heuristic probability threshold (H or H(t)) data 150. Even if two users are using the same model of device, their behaviors can be different. For example, user A uses a laptop computer as an office laptop that is used during the daytime, while user B uses the same laptop computer for gaming, mostly used in the evening. H(t) is used to address the user specific usage portrait, and is adjusted at runtime. In an example, the OS builds a mechanism (e.g., monitoring system 126 and/or software-based controller 118) to cache predictions (e.g., entry time or exit time, or user return time or user away time) and to detect user presence and/or user absence. When the presence and/or absence signal 146 is detected, the processor(s) 108 and/or the monitoring system 126 evaluates cached predictions, and adjusts H(t) accordingly. For example, if the prediction was entering a suspend state at time to and exiting at time $t_1$, but the user presence is detected at time $t_u$ that is between $t_0$ and $t_1$, H(t) is raised between $t_u$ and $t_1$. In this way, the device 102 is configured to wake before time $t_u$ and is set to be ready for the user presence at a next prediction or at a corresponding similar future time. H(t) may also be affected by the most recent behavior of the user. For example, if the user is actively working on a Saturday while the device 102 was historically mostly idle on Saturdays, H(t) is raised for the rest of the day to prevent the device 102 from being suspended.

Processor(s) 108 receives the base probability threshold (L or L(t)) data 142 and the heuristic probability threshold (H or H(t)) data 150 from the monitoring system 126, and may send the base probability threshold (L or L(t)) data 142 and the heuristic probability threshold (H or H(t)) data 150 to the input interface(s) 130, which also receives a power management model 152. The power management model 152 is based on a time-based probability of user absence relative to a dynamic probability threshold (DP(t)). The dynamic probability threshold (DP(t)) 154 is a function of the base probability threshold (L or L(t)) and the heuristic probability threshold (H or H(t)). In some instances, the dynamic probability threshold (DP(t)) 154 is a sum of the base probability threshold (L or L(t)) and the heuristic probability threshold (H or H(t)), according to the following equation:

$$DP(t)[L(t),H(t)]=L(t)+H(t). \quad \text{(Eqn. 1)}$$

System 100 further includes actuator(s) 160 and power source device 162. In examples, the OS 116 and/or the software-based controller 118 determines whether at least one of user presence or user absence at a correlated time (collectively referred to herein as "user state"), as obtained or extracted from the heuristic probability threshold (H or H(t)) data 150, is consistent with the power management model 152 that is based on the time-based probability of user absence relative to the dynamic probability threshold DP(t) 154. Based on a determination that the user presence state is inconsistent with the power management model 152, the OS 116 and/or the software-based controller 118 adjusts the dynamic probability threshold DP(t) 154 by adjusting the heuristic probability threshold (H or H(t)) to account for the user presence state; updating the power management model 152 based on the dynamic probability threshold DP(t) 154; and causing implementation of power management settings of the device 102 based on the update to the power management model 152. In examples, based on the power management model 152, the OS 116 and/or the software-based controller 118 sends a control signal 156 to the output interface(s) 132. The output interface(s) 132 in turn sends a control signal 158 to an actuator(s) 160 that is configured to control a power source device 162 to change a power management state of the device 102 either:

(a) from a sleep (or standby or hibernating) state to a wake (or working or awakened) state; or
(b) from a wake (or working or awakened) state to a sleep (or standby or hibernating) state.

Some power source devices 162 may be integrated within device 102, while other power source devices 162 may be external to, yet providing power via cables to, device 102. Yet other power source devices 162 are partially integrated and partial external to the device 102 although connected via cables to the integrated part of the power source device(s). Dash-lined arrows as shown in FIG. 1 denote transfer of threshold data 142, 148, and 150.

The functionalities of the power management system 128 are described in detail below with respect to FIGS. 2A-5. For instance, example graphical representations 200A-200C as described below with respect to FIGS. 2A-2C cover various examples of absence probability P(t) and corresponding dynamic probability threshold DP(t) for corresponding use cases. Example methods 300, 400, and 500 as described below with respect to FIGS. 3A-3C, 4, and 5 may be applied with respect to the operations of system 100 of FIG. 1.

Figure 2A:
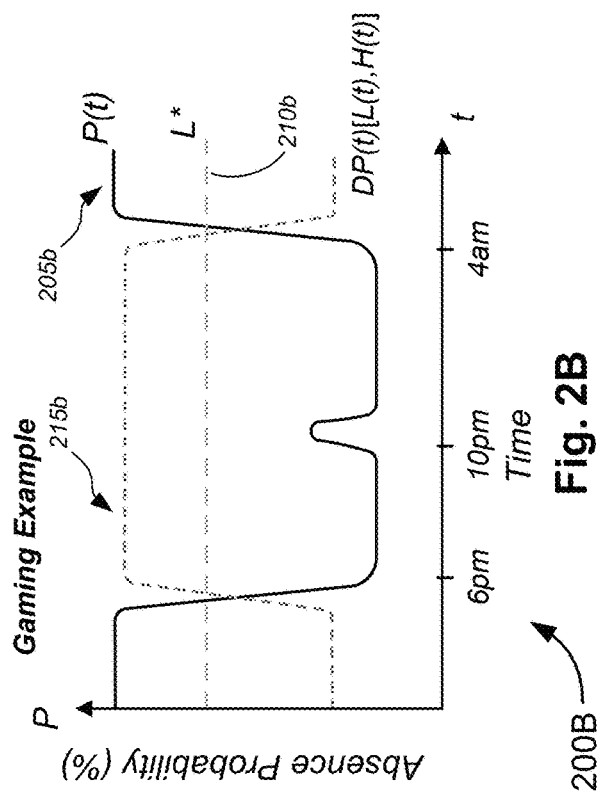
FIGS. 2A-2C depict various example graphical representations of dynamic probability thresholds for corresponding absence probability curves when implementing an adaptive threshold for user absence prediction for power state transitions.
Figure 2B:
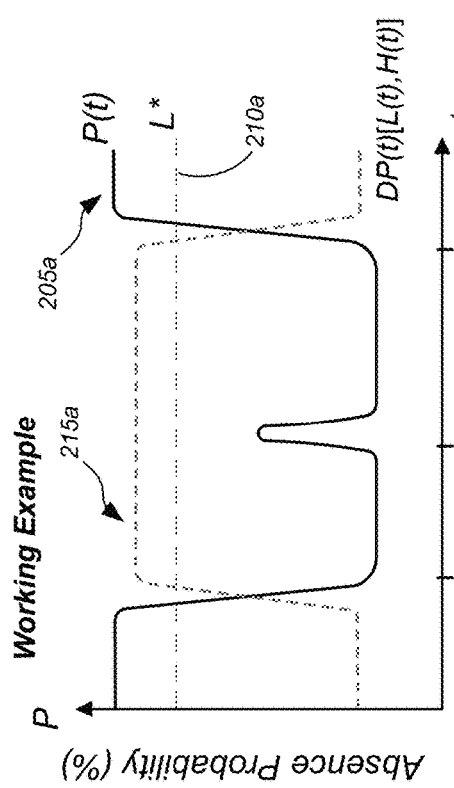
Figure 2C:
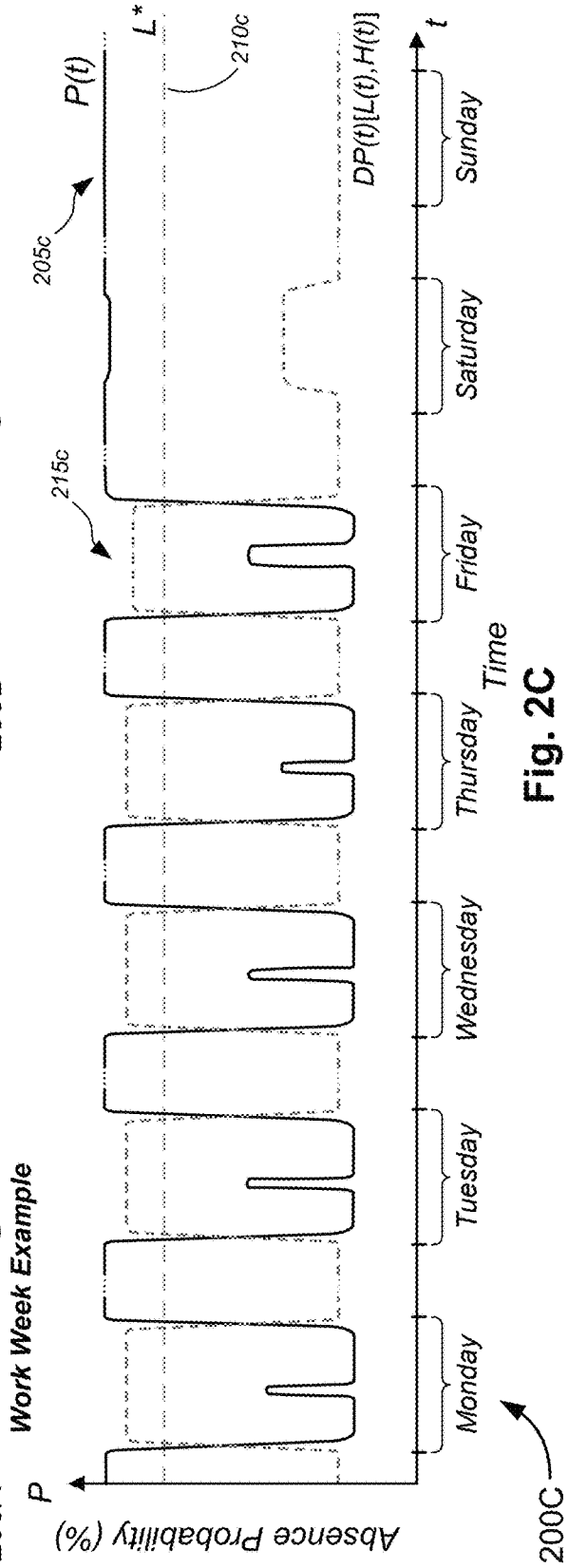

FIGS. 2A-2C depict various example graphical representations 200A-200C of dynamic probability thresholds for corresponding absence probability curves when implementing an adaptive threshold for user absence prediction for power state transitions.

With reference to FIG. 2A, for an example 200A in which a device is used for work during workday hours (referred to as "Working Example"), an absence probability P(t) 205a is shown indicating a high probability (e.g., >about 90%) before about 8 am and after about 6 pm, indicating a low probability (e.g., <about 20% or <about 10%) at or between about 8 am and about 12 μm and at or between about 1 μm and 6 μm, and indicating a mid-level probability (e.g., between about 30% and about 70%) between about 12 μm and about 1 μm. The absence probability P(t) 205a may be calculated based on calculated or monitored user presence and/or user absence over time. Instead of a static preset probability limit L* 210a that is set at a constant level (e.g., at about 75%), the various embodiments utilize a dynamic probability threshold DP(t) 215a, which is a function of a base probability threshold L(t) and a heuristic probability threshold H(t), as described in detail above with respect to Eqn. 1. As shown in FIG. 2A, the dynamic probability threshold DP(t) 215a may be adjusted to a low level (e.g., at about 15% or about 25%) before about 7 am and after about 7 μm, and adjusted to a high level (e.g., at about 80% or about 85%) between about 8 am and about 6 pm. As shown in FIG. 2A, the transition from a high probability to a low probability, or vice versa, or from a high level to a low level, or vice versa, may include a slightly gradual transition over the span of a quarter hour, a half hour, or an hour.

In examples, a system (e.g., OS 116 or software-based controller 118 of FIG. 1) causes the device (e.g., device 102 of FIG. 1) to be set to a sleep state or a wake state based on whether the absence probability P(t) value is above or below the DP(t) value 215a, respectively, for a particular time t. In the wake state, the power management system causes a short suspend state that reduces the power usage when the user is determined to be inactive or away for a brief period during which the display screen is set to a locked state, a dimmed state, or a dark state to conserve power. The short suspend state differs from the sleep or hibernate state (or long suspend state) in terms of recovery time. A long recovery time affects user interaction with the device. For a very high threshold level (e.g., at a level greater than about 85%) at any one time t, the system causes the device to be active with short suspend states in a wake state, where recovery from the short suspend states is quick (e.g., a few seconds). For a very low threshold level (e.g., at a level lower than about 20%) at any one time t, the system causes the device to be set in a long suspend state in a sleep or hibernate state, where recovery from the long suspend state is prolonged (e.g., >30 seconds or several minutes).

Referring to FIG. 2B, for an example 200B in which a device is used for gaming during evening and nighttime hours (referred to as "Gaming Example"), an absence probability P(t) 205*b* is shown indicating a high probability (e.g., >about 90%) before about 6 μm and after about 4 am, indicating a low probability (e.g., <about 20% or <about 10%) at or between about 6 μm and about 10 μm and at or between about 11:30 pm and 4 am, and indicating a mid-level probability (e.g., between about 20% and about 50%) between about 10 μm and about 11:30 pm. Instead of a static preset probability limit L* 210*b* that is set at a constant level (e.g., at about 65%), the various embodiments utilize a dynamic probability threshold DP(t) 215*b*, similar to dynamic probability threshold DP(t) 215*a*. As shown in FIG. 2B, the dynamic probability threshold DP(t) 215*b* may be adjusted to a low level (e.g., at about 15% or about 25%) before about 5 μm and after about 5 am, and adjusted to a high level (e.g., at about 85%) between about 6 μm and about 4 am. Example 200B is otherwise similar to example 200A of FIG. 2A.

Turning to FIG. 2C, for an example 200C in which a device is used for work during workday hours of a workday and not during weekends (referred to as "Work Week Example"), an absence probability P(t) 205*c* is shown indicating, for a weekday (i.e., Monday through Friday), a high probability (e.g., >about 90%) before about 8 am and after about 6 pm, indicating a low probability (e.g., <about 20% or <about 10%) at or between about 8 am and about 12 μm and at or between about 1 μm and 6 μm, and indicating a mid-level probability (e.g., between about 30% and about 70%) between about 12 μm and about 1 μm. For Saturdays, the absence probability P(t) 205*c* is shown indicating a high probability (e.g., >about 90%) for much of the day, except with a lower probability (e.g., >about 85%) during daytime hours. For Sundays, the absence probability P(t) 205*c* is shown indicating a high probability (e.g., >about 90%) all day. Instead of a static preset probability limit L* 210*c* that is set at a constant level (e.g., at about 75%), the various embodiments utilize a dynamic probability threshold DP(t) 215*c*, similar to dynamic probability threshold DP(t) 215*a*, except for the weekend days. For Saturdays, the dynamic probability threshold DP(t) 215*c* is adjusted to a mid-level (e.g., at about 30% or about 40%) during daytime hours. For Sundays, the dynamic probability threshold DP(t) 215*c* is adjusted to a low probability (e.g., <about 20% or <about 10%) all day. In FIG. 2C, the portions labelled "Monday," "Tuesday," and so on refer to daytime periods of those days, with ellipses (" . . . ") between these periods denoting non-daytime periods that are hidden, where during these hidden periods the respective curves are unchanged. The probability values, percentages, and threshold levels shown in FIGS. 2A-2C are arbitrary and may be altered without departing from the scope of this disclosure.

Referring to FIGS. 3A-5, the operations of example methods 300-500, respectively, may be performed by a computing system, such as a controller of a power management system (e.g., power management system 128 of FIG. 1), and the controller is part of an OS of a device and the operations are performed using one of the OS of the device or software running on the OS (e.g., OS 116 of device 102 or software-based controller 118 of FIG. 1). In some cases, example method 400 either is implemented using the computing system as described above or is implemented using a system that is external to the device. In some instances, example method 500 is implemented using a power management model that is trainable or updatable, in some cases, using an artificial intelligence ("AI") system. In some examples, the AI system uses a machine learning ("ML") model to train or update the power management model. In examples, the ML model includes a convolutional neural network ("CNN") model, a recurrent neural network ("RNN") model, a deep neural network ("DNN") model, a transformer model, and/or a long short-term memory network ("LSTM") model. In some instances, the power management model itself is an ML model that is trained or updated by the AI system, or is a language model ("LM"). In examples, the LM includes a small language model ("SLM"), a large language model ("LLM"), or other language model. As used herein, an LLM refers to a machine learning model that is trained and fine-tuned on a large corpus of media (e.g., text, audio, video, or software code), and that can be accessed and used through an application programming interface ("API") or a platform. An SLM is similar to an LLM, except that it has fewer parameters and requires less data and time to be trained. An SLM and an LLM each performs a variety of tasks, including generating and classifying media, answering user requests and questions in a conversational manner, and translating text from one language to another. Examples of LLMs (or more generally language models ("LMs")) include Bidirectional Encoder Representations from Transformers ("BERT"), Word2Vec, Global and Vectors ("GloVe"), Embeddings from Language Models ("ELMo"), XLNet, Generative Pre-trained Transformer ("GPT")-3 or GPT-4, Large Language Model Meta AI ("LLaMA") 2, or BigScience Large Open-science Open-access Multilingual Language Model (BLOOM).

Figure 3A:
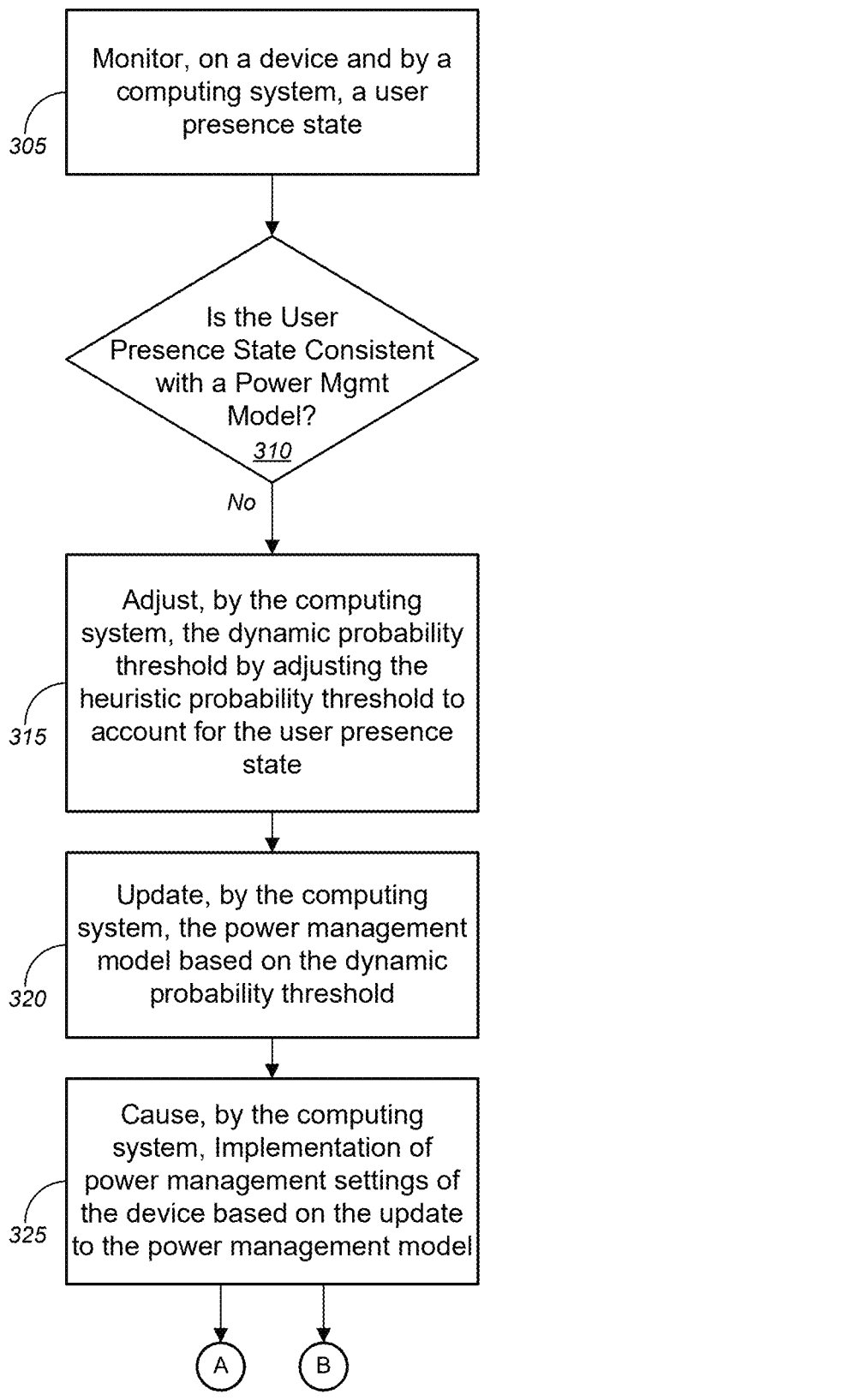

FIGS. 3A-3C depict an example method 300 for implementing an adaptive threshold for user absence prediction for power state transitions. Method 300 of FIG. 3A either continues onto FIG. 3B following the circular marker denoted, "A," or continues onto FIG. 3C following the circular marker denoted, "B."

With reference to FIG. 3A, method 300, at operation 305, includes monitoring, on a device and by the computing system, a user presence state, the user presence state including at least one of user presence or user absence of a user, in some cases, correlated with time. In some instances, the correlated time includes time-of-day within a third period including at least one of a day, a weekday, a weekend, a week, a month, a season, an annual quarter, a year, or a decade. In some examples, monitoring the user presence state (at operation 305) is based on at least one of a detection of a user presence signal correlated with time or a detection of a user absence signal correlated with time. In examples, the user presence corresponds to a first period during which the user is determined to be interacting with the device. In some cases, the user absence corresponds to a second period during which the user is determined to be away from the device. In an example, the computing system detects that the user is usually absent at least 15 minutes in the morning and every two hours, and longer than 15 minutes and more frequently in the afternoon. In some instances, the time with which the user presence state is correlated corresponds to a system time of the device (e.g., time according to a system clock).

Method 300 includes determining, by the computing system, whether the user presence state is consistent with a power management model that is based on a time-based probability of user absence relative to a dynamic probability threshold (at operation 310). The dynamic probability threshold is a function of a base probability threshold that corresponds to device-specific time-usage characteristics and a heuristic probability threshold that corresponds to user-specific time-usage characteristics, as described above with respect to Eqn. 1. In examples, the user presence state is determined to be inconsistent with the power management model when at least one of user presence states is detected by the device: (a) when the device detects that the user is away from the device when the power management model indicates that the user is supposed to be interacting with the device; and/or (b) when the device detects that the user is interacting with the device when the power management model indicates that the user is supposed to be away from the device.

Based on a determination that the user presence state is inconsistent with the power management model, method 300 further includes, at operation 315, adjusting, by the computing system, the dynamic probability threshold by adjusting the heuristic probability threshold to account for the user presence state. Method further includes updating the power management model based on the dynamic probability threshold (at operation 320); and causing, by the computing system, implementation of power management settings of the device based on the update to the power management model (at operation 325).

In some examples, at least one of the base probability threshold (L) or the heuristic probability threshold (H) varies over time t, e.g., as denoted by L(t) and H(t), as described with respect to Eqn. 1. In some cases, the power management model indicates user absence at a first time when a probability value of the time-based probability of user absence, for the first time, is above the dynamic probability threshold. In some instances, the power management model indicates user presence at a second time when a probability value of the time-based probability of user absence, for the second time, is below the dynamic probability threshold. That is, when the probability value (e.g., absence probability P(t) 205a-205c of FIGS. 2A-2C) is above the dynamic probability threshold (e.g., dynamic probability threshold DP(t) 215a-215c of FIGS. 2A-2C), this is indicative of user absence, as shown, e.g., in FIGS. 2A and 2C between daylight hours of adjacent weekdays or as shown in FIG. 2B during daylight hours when the curves P(t) 205a-205c are above the corresponding curves DP(t) 215a-215c or when for time t, P(t) is greater than DP(t). By contrast, when the probability value (e.g., absence probability P(t) 205a-205c of FIGS. 2A-2C) is below the dynamic probability threshold (e.g., dynamic probability threshold DP(t) 215a-215c of FIGS. 2A-2C), this is indicative of user presence, as shown in FIGS. 2A and 2C during daylight hours of weekdays or as shown, e.g., in FIG. 2B during evening and nighttime hours when the curves P(t) 205a-205c are below the corresponding curves DP(t) 215a-215c or when for time t, P(t) is less than DP(t). In examples, the base probability threshold is set or adjusted by an OS producer of the OS of the device, an OEM of the device, a system administrator for the device, or a software module operating on the device.

In examples, the power management model is specific to both the user and the device. In some examples, the power management model is further based on at least one of calendar information or task scheduler information corresponding to periods during which user presence is expected. In an example, if a user's calendar or task scheduler indicates that the user is scheduled to take a work-related international call on Monday evening after the user's typical work-day schedule (e.g., 8 p.m.), the power management model is updated based on corresponding calendar information or corresponding task scheduler information regarding the scheduled work-related international call, by updating heuristic probability threshold with user presence at the scheduled time of the work-related international call. In another example, if the user's calendar or task scheduler indicates that the user is scheduled to go on vacation (e.g., to a destination with limited or no network connection, or with no electricity), the power management model is updated based on corresponding calendar information or corresponding task scheduler information regarding the scheduled vacation, by updating heuristic probability threshold with user absence at the scheduled days and times of the vacation.

In some examples, method 300 continues from the process at operation 325 onto the process at operation 330 in FIG. 3B following the circular marker denoted, "A." Alternatively, or additionally, method 300 continues from the process at operation 325 onto the process at operation 350 in FIG. 3C following the circular marker denoted, "B."

At operation 330 in FIG. 3B (following the circular marker denoted, "A," in FIG. 3A), method 300 includes identifying, by the computing system, at least one of a user presence trend or a user absence trend, based on analysis of at least one of historical user presence information or historical user absence information. Method 300 includes, at operation 335, adjusting, by the computing system, the dynamic probability threshold by adjusting the heuristic probability threshold based on the at least one of the user presence trend or the user absence trend. At operation 340, method 300 further includes updating, by the computing system, the power management model based on the dynamic probability threshold. Method 300 further includes causing, by the computing system, implementation of power management settings of the device based on the update to the power management model (at operation 345).

At operation 350 in FIG. 3C (following the circular marker denoted, "B," in FIG. 3A), method 300 may include identifying, by the computing system, a renewable energy period during which power being supplied to the device is determined to be generated by a renewable energy source. Method 300, at operation 355, includes identifying, by the computing system, a user absence period within the renewable energy period during which the power management model indicates user absence. Method 300 further includes adjusting, by the computing system, the dynamic probability threshold by adjusting the heuristic probability threshold corresponding to the user absence period to enable system background operations during user absence (at operation 360). At operation 365, method 300 includes updating, by the computing system, the power management model based on the dynamic probability threshold. Method 300 further includes, at operation 370, causing, by the computing system, implementation of power management settings of the device based on the update to the power management model. Method 300 further includes causing, by the computing system, the system background operations for the device to be scheduled during the user absence period (at operation 375). In examples, the system background operations for the device include one of system updates, background maintenance operations, software installation operations, or data backup operations.

Figure 4:
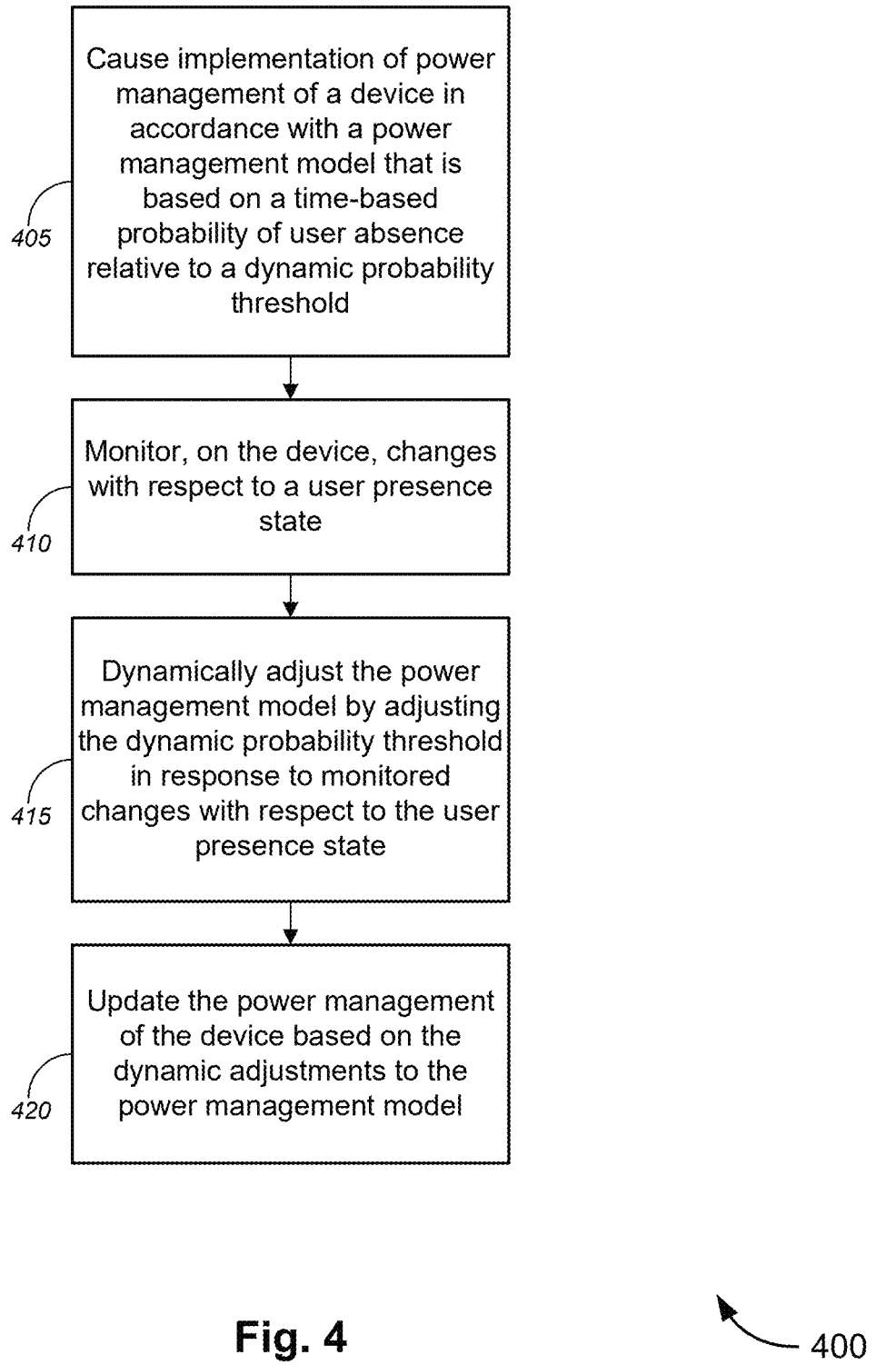
FIG. 4 depicts another example method for implementing an adaptive threshold for user absence prediction for power state transitions.

FIG. 4 depicts another example method 400 for implementing an adaptive threshold for user absence prediction for power state transitions. In the example of FIG. 4, method 400, at operation 405, includes causing implementation of power management of a device in accordance with a power management model that is based on a time-based probability of user absence relative to a dynamic probability threshold. The dynamic probability threshold is a function of a base probability threshold that corresponds to device-specific time-usage characteristics and a heuristic probability threshold that corresponds to user-specific time-usage characteristics. In some instances, the dynamic probability threshold is a sum of the base probability threshold and the heuristic probability threshold, as described in detail above.

The method 400 further includes, at operation 410, monitoring, on the device, changes with respect to a user presence state, including at least one of user presence or user absence. At operation 415, method 400 further includes dynamically adjusting the power management model by adjusting the dynamic probability threshold in response to monitored changes with respect to the user presence state—that is, the at least one of the user presence or the user absence. In examples, adjusting the dynamic probability threshold includes adjusting the heuristic probability threshold. Method 400 further includes updating the power management of the device based on the dynamic adjustments to the power management model (at operation 420). Method 400 of FIG. 4 is otherwise similar to method 300 of FIGS. 3A-3C.

Figure 5:
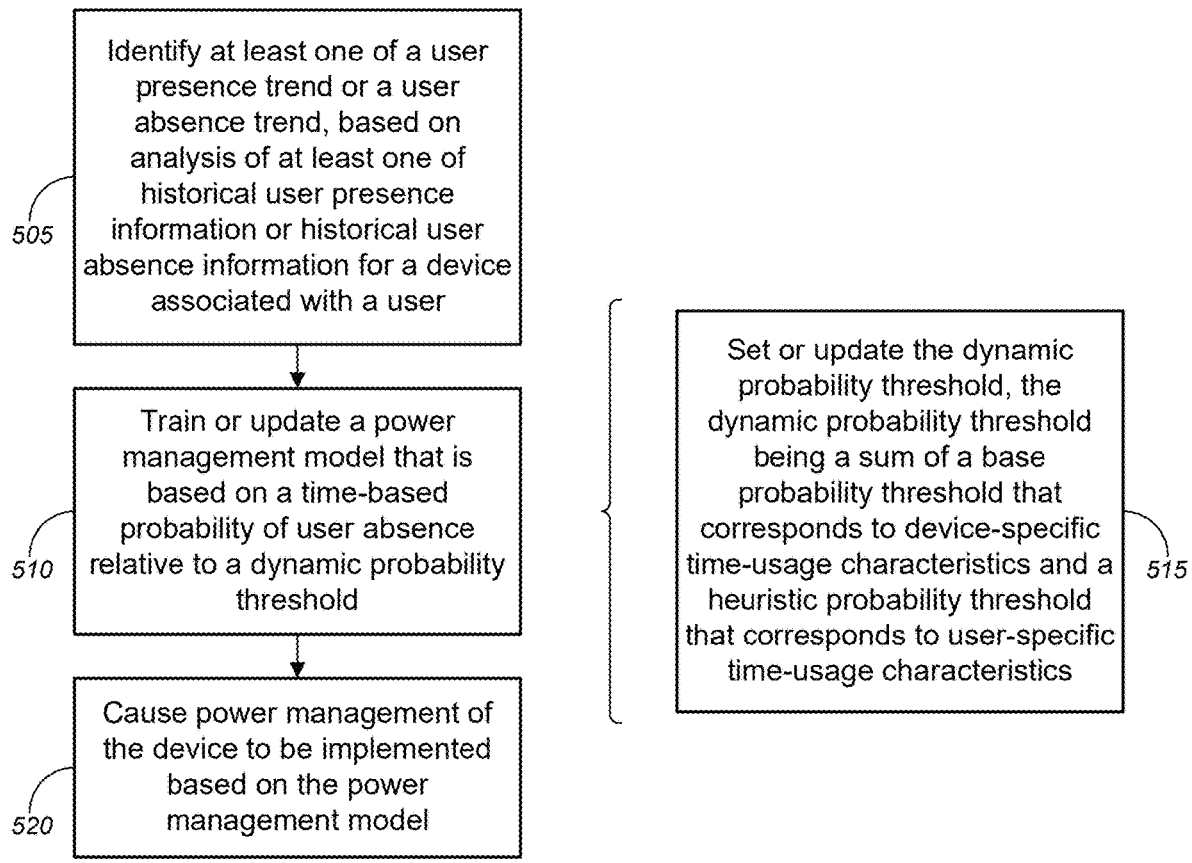
FIG. 5 depicts yet another example method for implementing an adaptive threshold for user absence prediction for power state transitions.

FIG. 5 depicts yet another example method 500 for implementing an adaptive threshold for user absence prediction for power state transitions. With reference to FIG. 5, method 500 includes, identifying at least one of a user presence trend or a user absence trend, based on analysis of at least one of historical user presence information or historical user absence information for a device associated with a user. Method 500 further includes training or updating a power management model that is based on a time-based probability of user absence relative to a dynamic probability threshold (at operation 510), in some cases, by setting or updating the dynamic probability threshold, the dynamic probability threshold being a sum of a base probability threshold that corresponds to device-specific time-usage characteristics and a heuristic probability threshold that corresponds to user-specific time-usage characteristics (at operation 515). Method 500, at operation 520, further includes causing power management of the device to be implemented based on the power management model. Method 500 of FIG. 5 is otherwise similar to method 300 of FIGS. 3A-3C and/or method 400 of FIG. 4.

While the techniques and procedures in methods 300, 400, and 500 are depicted and/or described in a certain order for purposes of illustration, it should be appreciated that certain procedures may be reordered and/or omitted within the scope of various embodiments. Moreover, while the methods 300, 400, and 500 may be implemented by or with (and, in some cases, are described below with respect to) the systems, examples, or embodiments 100, 200A, 200B, and 200C of FIGS. 1, 2A, 2B, and 2C, respectively (or components thereof), such methods may also be implemented using any suitable hardware (or software) implementation. Similarly, while each of the systems, examples, or embodiments 100, 200A, 200B, and 200C of FIGS. 1, 2A, 2B, and 2C, respectively (or components thereof), can operate according to the methods 300, 400, and 500 (e.g., by executing instructions embodied on a computer readable medium), the systems, examples, or embodiments 100, 200A, 200B, and 200C of FIGS. 1, 2A, 2B, and 2C can each also operate according to other modes of operation and/or perform other suitable procedures.

As should be appreciated from the foregoing, the present technology provides multiple technical benefits and solutions to technical problems. For instance, implementing power management for user devices generally raises multiple technical problems. For instance, one technical problem includes issues with selecting or setting a probability limit L* (such as a traditional fixed probability limit) to find user inactive. Too conservative a prediction by setting the probability limit L* too high results in a system tending to set the user device to be being active with short suspend durations, which further results in wasted energy during the resultant active state while the user is away. Too aggressive a prediction by setting the probability limit L* too low results in the system tending to set the user device to be being suspended with long suspend durations or with more frequent suspend states, which further results in slow response speeds and non-optimized user experience ("UX") conditions (collectively, responsiveness or device responsiveness). The present technology provides an adaptive threshold for user absence prediction for power state transitions. The adaptive threshold is based on a dynamic probability threshold that is a function of (in some cases, a sum of) a base probability threshold (e.g., L(t)) that corresponds to device-specific time-usage characteristics and a heuristic probability threshold (e.g., H(t)) that corresponds to user-specific time-usage characteristics. By replacing the traditional fixed probability limit L* with a dynamic and adaptive model, the system described herein provides an efficient solution to optimizing computer power state transitions (from a wake to a sleep state, or vice versa). Customization based on both device-specific characteristics L(t) and individual user behavior H(t) ensures an optimal balance between energy savings and responsiveness, addressing the limitations of existing power management systems.

Figure 6:
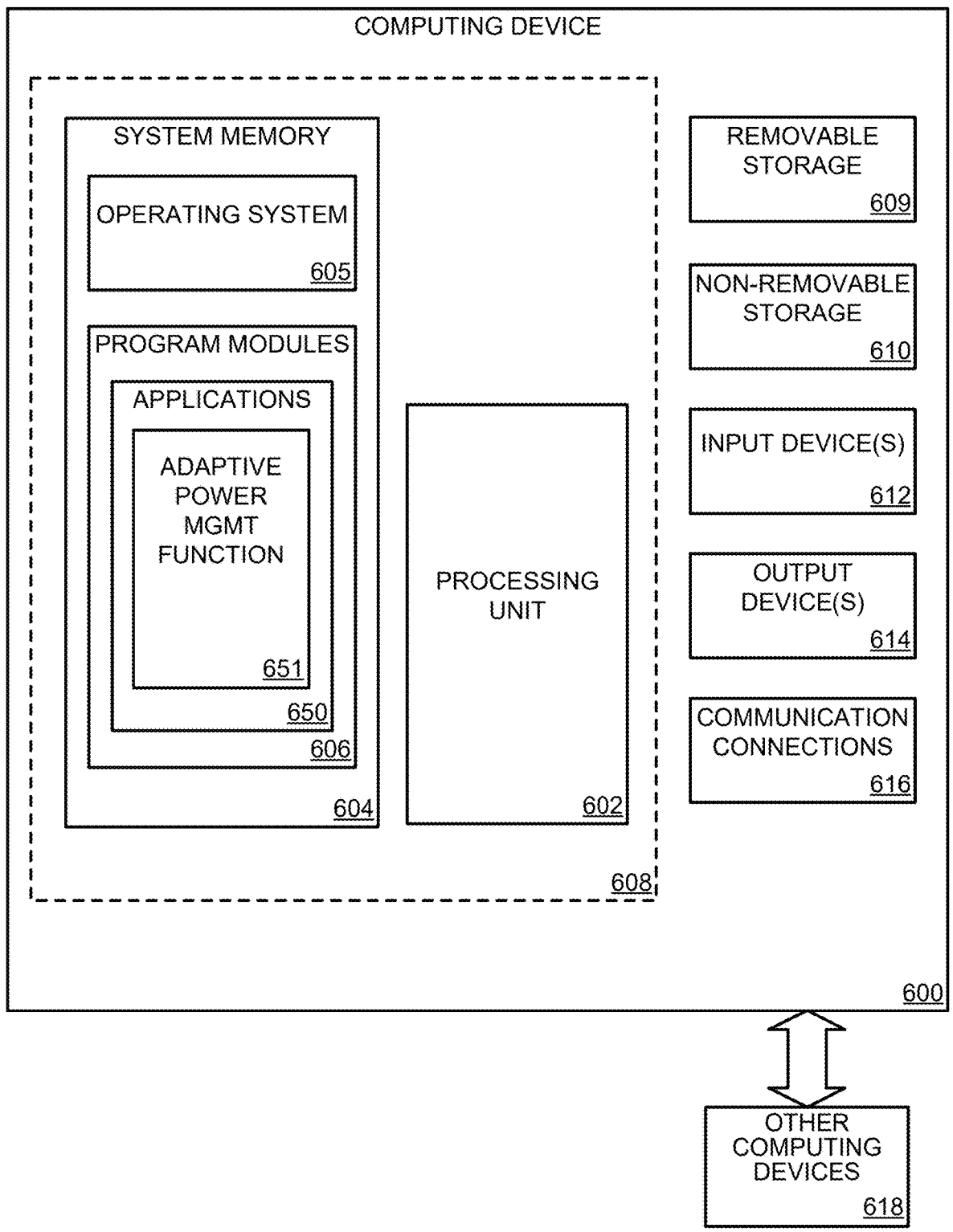
FIG. 6 depicts a block diagram illustrating example physical components of a computing device with which aspects of the technology may be practiced.

FIG. 6 depicts a block diagram illustrating physical components (i.e., hardware) of a computing device 600 with which examples of the present disclosure may be practiced. The computing device components described below may be suitable for a client device implementing the adaptive threshold for user absence prediction for power state transitions, as discussed above. In a basic configuration, the computing device 600 includes at least one processing unit 602 and a system memory 604. The processing unit(s) (e.g., processors) may be referred to as a processing system. Depending on the configuration and type of computing device, the system memory 604 may include volatile storage (e.g., random access memory), non-volatile storage (e.g., read-only memory), flash memory, or any combination of such memories. The system memory 604 may include an operating system 605 and one or more program modules 606 suitable for running software applications 650, such as adaptive power management function 651, to implement one or more of the systems or methods described above.

The operating system 605, for example, is suitable for controlling the operation of the computing device 600. Furthermore, aspects of the invention are practiced in conjunction with a graphics library, other operating systems, or any other application program and is not limited to any particular application or system. This basic configuration is illustrated in FIG. 6 by those components within a dashed line 608. The computing device 600 may have additional features or functionalities. For example, the computing device 600 also includes additional data storage devices (which may be removable and/or non-removable), such as, for example, magnetic disks, optical disks, or tape. Such additional storage is illustrated in FIG. 6 by a removable storage device(s) 609 and a non-removable storage device(s) 610.

As stated above, a number of program modules and data files may be stored in the system memory 604. While executing on the processing unit 602, the program modules 606 may perform processes including one or more of the operations of the method(s) as illustrated in FIGS. 3A-5, or one or more operations of the system(s) and/or apparatus(es) as described with respect to FIGS. 1-2C, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 6 is integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 600 may also have one or more input devices 612 such as a keyboard, a mouse, a pen, a sound input device, and/or a touch input device, etc. The output device(s) 614 such as a display, speakers, and/or a printer, etc. may also be included. The aforementioned devices are examples and others may be used. The computing device 600 may include one or more communication connections 616 allowing communications with other computing devices 618. Examples of suitable communication connections 616 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 604, the removable storage device 609, and the non-removable storage device 610 are all computer storage media examples (i.e., memory storage). Computer storage media may include RAM, read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system that executes computer executable instructions that cause the system to perform operations comprising:
   monitoring, on a device, a user presence state, the user presence state including at least one of user presence or user absence;
   determining whether the user presence state is consistent with a power management model based on a time-based probability of user presence or user absence relative to a dynamic probability threshold, the dynamic probability threshold being a function of a base probability threshold that corresponds to device-specific time-usage characteristics and a heuristic probability threshold that corresponds to user-specific time-usage characteristics; and
   based on a determination that the user presence state is inconsistent with the power management model,
      adjusting the dynamic probability threshold by adjusting the heuristic probability threshold to account for the user presence state;
      updating the power management model based on the dynamic probability threshold; and
      causing implementation of power management settings of the device based on the update to the power management model.

2. The system of claim 1, wherein monitoring the user presence state is based on at least one of a detection of a user presence signal correlated with time or a detection of a user absence signal correlated with time.

3. The system of claim 1, wherein the user presence corresponds to a first period during which a user is determined to be interacting with the device, wherein the user absence corresponds to a second period during which the user is determined to be away from the device, wherein the time with which the user presence state is correlated corresponds to a system time of the device, wherein the user presence state is determined to be inconsistent with the power management model when at least one of user presence states is detected by the device:
   when the device detects that the user is away from the device when the power management model indicates that the user is supposed to be interacting with the device; or
   when the device detects that the user is interacting with the device when the power management model indicates that the user is supposed to be away from the device.

4. The system of claim 1, wherein at least one of the base probability threshold or the heuristic probability threshold varies over time,
   wherein the power management model indicates user absence at a first time when a probability value of the time-based probability of user absence, for the first time, is above the dynamic probability threshold,
   wherein the power management model indicates user presence at a second time when a probability value of the time-based probability of user absence, for the second time, is below the dynamic probability threshold.

5. The system of claim 1, wherein the base probability threshold is set or adjusted by an operating system ("OS") producer of an OS of the device, an original equipment manufacturer ("OEM") of the device, a system administrator for the device, or a software module operating on the device.

6. The system of claim 1, wherein the power management model is further based on at least one of calendar information or task scheduler information corresponding to periods during which user presence is expected.

7. The system of claim 1, wherein the power management model is specific to both a user and the device.

8. The system of claim 1, wherein the correlated time includes time-of-day within a third period including at least one of a day, a weekday, a weekend, a week, a month, a season, an annual quarter, a year, or a decade.

9. The system of claim 1, wherein the operations are performed using one of an OS of the device or software running on the OS.

10. The system of claim 1, wherein the operations further comprise:
   identifying at least one of a user presence trend or a user absence trend, based on analysis of at least one of historical user presence information or historical user absence information;
   adjusting the dynamic probability threshold by adjusting the heuristic probability threshold based on the at least one of the user presence trend or the user absence trend;
   updating the power management model based on the dynamic probability threshold; and causing implementation of power management settings of the device based on the update to the power management model.

11. The system of claim 1, wherein the operations further comprise:
identifying a fourth period during which power being supplied to the device is determined to be generated by a renewable energy source;
identifying a fifth period within the fourth period during which the power management model indicates user absence;
adjusting the dynamic probability threshold by adjusting the heuristic probability threshold corresponding to the fifth period to enable system background operations during user absence;
updating the power management model based on the dynamic probability threshold;
causing implementation of power management settings of the device based on the update to the power management model; and
causing the system background operations for the device to be scheduled during the fifth period.

12. The system of claim 11, wherein the system background operations for the device include one of system updates, background maintenance operations, software installation operations, or data backup operations.

13. A computer-implemented method, comprising:
causing implementation of power management of a device in accordance with a power management model based on a time-based probability of user absence relative to a dynamic probability threshold, the dynamic probability threshold being a function of a base probability threshold that corresponds to device-specific time-usage characteristics and a heuristic probability threshold that corresponds to user-specific time-usage characteristics;
monitoring, on the device, changes with respect to a user presence state, the user presence state including at least one of user presence or user absence;
dynamically adjusting the power management model by adjusting the dynamic probability threshold in response to monitored changes with respect to the user presence state; and
updating the power management of the device based on the dynamic adjustments to the power management model.

14. The computer-implemented method of claim 13, wherein the dynamic probability threshold is a sum of the base probability threshold and the heuristic probability threshold.

15. The computer-implemented method of claim 13, wherein adjusting the dynamic probability threshold comprises adjusting the heuristic probability threshold.

16. The computer-implemented method of claim 13, wherein at least one of the base probability threshold or the heuristic probability threshold varies over time,
wherein the power management model indicates user absence at a first time when a probability value of the time-based probability of user absence, for the first time, is above the dynamic probability threshold,
wherein the power management model indicates user presence at a second time when a probability value of the time-based probability of user absence, for the second time, is below the dynamic probability threshold,
wherein the base probability threshold is set or adjusted by an operating system ("OS") producer of an OS of the device, an original equipment manufacturer ("OEM") of the device, a system administrator for the device, or a software module operating on the device.

17. A system that executes computer executable instructions that cause the system to perform operations comprising:
identifying at least one of a user presence trend or a user absence trend, based on analysis of at least one of historical user presence information or historical user absence information for a device associated with a user;
training or updating a power management model that is based on a time-based probability of user absence relative to a dynamic probability threshold, by
setting or updating the dynamic probability threshold, the dynamic probability threshold being a sum of a base probability threshold and a heuristic probability threshold, wherein the base probability threshold corresponds to device-specific time-usage characteristics and the heuristic probability threshold corresponds to user-specific time-usage characteristics; and
causing power management of the device to be implemented based on the power management model.

18. The system of claim 17, wherein at least one of the base probability threshold or the heuristic probability threshold varies over time,
wherein user absence is determined for a first period when, during that first period, a probability value of the time-based probability of user absence is greater than the dynamic probability threshold,
wherein user presence is determined for a second period when, during that second period, the probability value of the time-based probability of user absence is less than the dynamic probability threshold.

19. The system of claim 17, wherein the base probability threshold is set or adjusted by an operating system ("OS") producer of an OS of the device, an original equipment manufacturer ("OEM") of the device, a system administrator for the device, or a software module operating on the device.

20. The system of claim 17, wherein the power management model is further based on at least one of calendar information or task scheduler information corresponding to periods during which user presence is expected.

* * * * *